(12) United States Patent
Watanabe

(10) Patent No.: US 11,262,207 B2
(45) Date of Patent: Mar. 1, 2022

(54) USER INTERFACE

(71) Applicant: INTERNATIONAL BUSINESS MACHINES CORPORATION, Armonk, NY (US)

(72) Inventor: Shoichiro Watanabe, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 609 days.

(21) Appl. No.: 16/200,763

(22) Filed: Nov. 27, 2018

(65) Prior Publication Data

US 2020/0166372 A1 May 28, 2020

(51) Int. Cl.
*G01C 21/36* (2006.01)

(52) U.S. Cl.
CPC ..... *G01C 21/3676* (2013.01); *G01C 21/3617* (2013.01); *G01C 21/3664* (2013.01)

(58) Field of Classification Search
CPC ............ G01C 21/3676; G01C 21/3617; G01C 21/3664; G01C 21/3484
See application file for complete search history.

(56) References Cited

U.S. PATENT DOCUMENTS

| 2007/0150174 A1* | 6/2007 | Seymour ............ G01C 21/3617 701/532 |
| 2014/0279723 A1* | 9/2014 | McGavran ............... H04L 67/10 706/11 |
| 2014/0358825 A1 | 12/2014 | Phillipps et al. |
| 2015/0292893 A1* | 10/2015 | Bartsch .................. G01C 21/34 701/408 |
| 2015/0339572 A1 | 11/2015 | Achin et al. |
| 2016/0069695 A1* | 3/2016 | Broadbent ......... G01C 21/3415 701/411 |
| 2017/0109649 A1 | 4/2017 | Baughman et al. |
| 2017/0124486 A1 | 5/2017 | Chan et al. |

OTHER PUBLICATIONS https://www.tomtom.com/en_gb/trafficindex/city/BRT, "Bratislava traffic congestion statistics | TomTom Traffic Index", printed Jul. 20, 2018, pp. 1-3.
https://www.ibm.com/il-en/marketplace/geospatial-big-data-analytics, "IBM PAIRS Services—Overview—Israel", printed Nov. 26, 2018, p. 1.
https://translate.google.com/translate?hl=en&sl=ja&u=https://www.toyot . . . , "Toyota", 1995-2018 Toyota Motor Corporation, p. 1.

* cited by examiner

*Primary Examiner* — Nadeem Odeh
(74) *Attorney, Agent, or Firm* — Anthony Curro

(57) ABSTRACT

Embodiments are directed to a user interface for superimposingly displaying, on a map, a plurality of travel route patterns reflecting tendencies of movements of a moving object and a new travel route predicted using the plurality of travel route patterns. The plurality of travel route patterns being extracted in advance by analyzing traveling history data of the moving object and being displayed in different manners, according to a prediction probability between each of the plurality of travel route patterns and the new travel route.

15 Claims, 13 Drawing Sheets

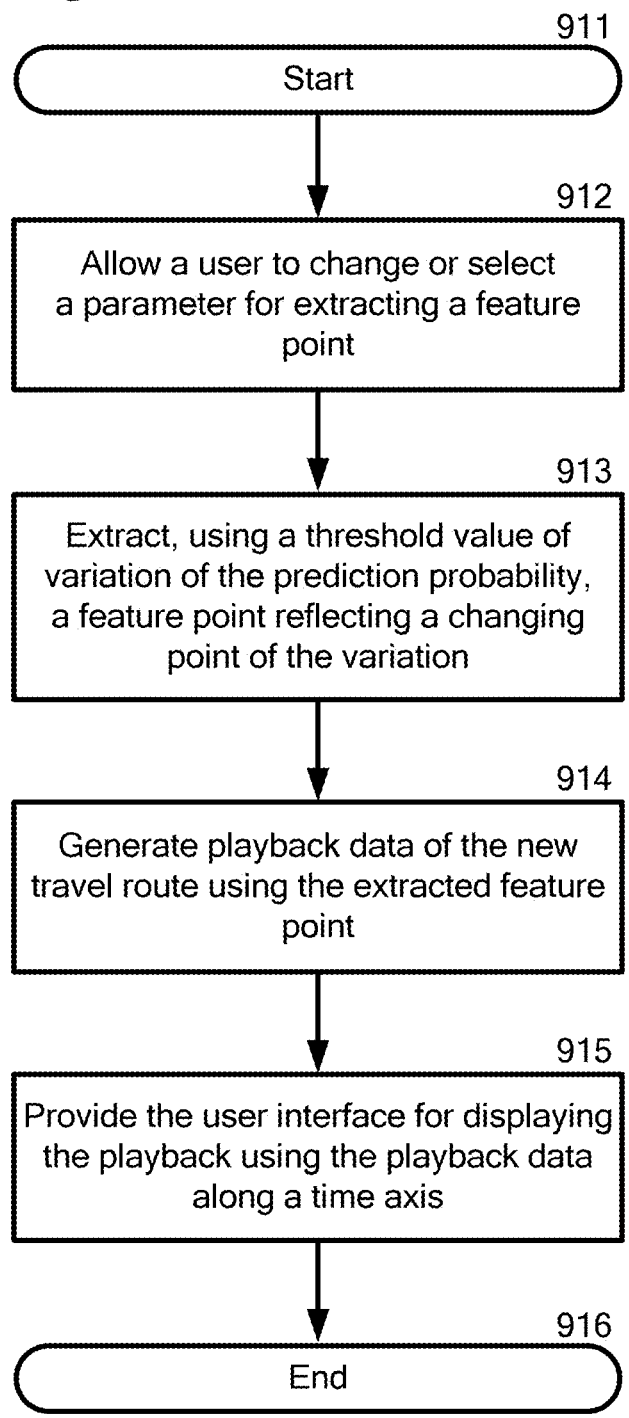

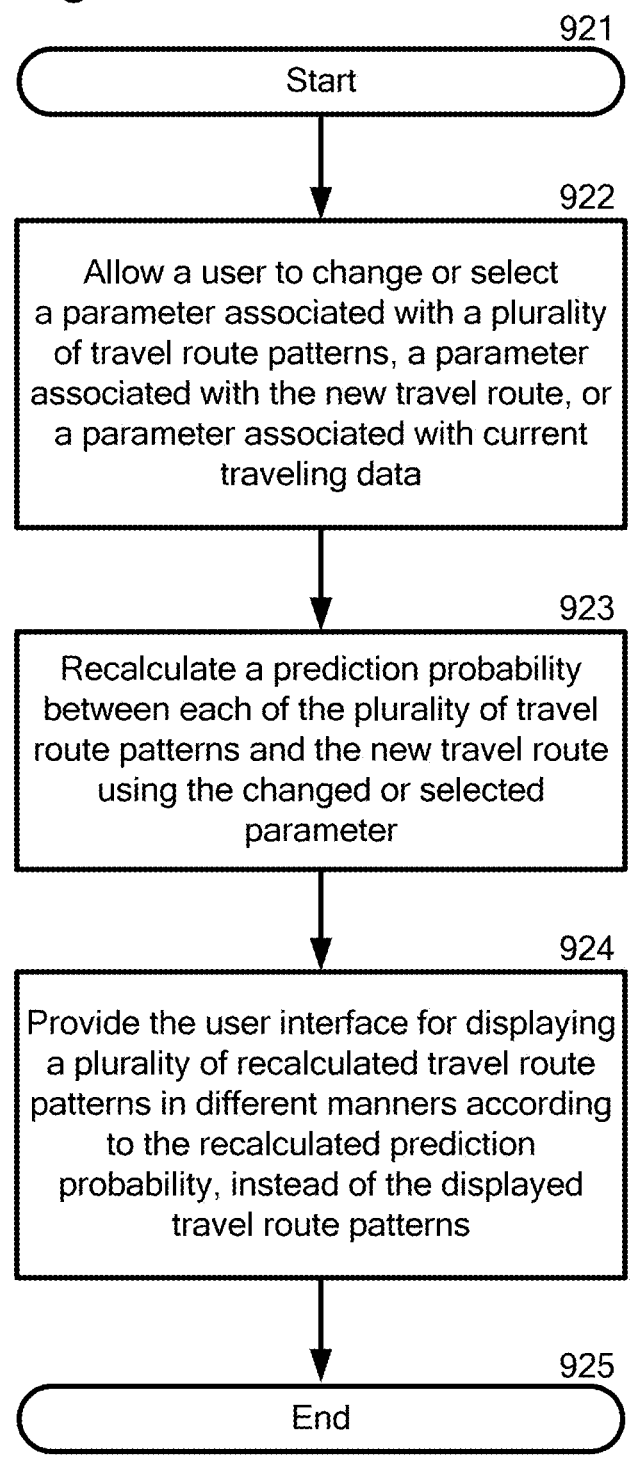

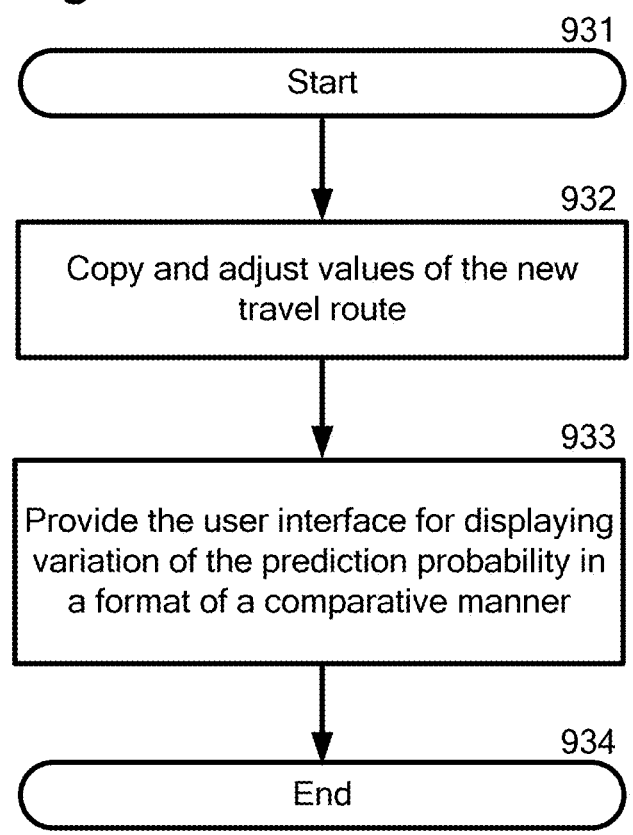

USER INTERFACE

Embodiments of the present invention relate generally to a user interface, and more particularly to providing a user interface for a superimposition display of travel route information.

BACKGROUND

Moving objects, such as vehicles, rapidly become "connected vehicles" that access, consume, and create information and share it with drivers, passengers, public infrastructure, and machines including other vehicles.

A connected vehicle solution relating to the connected vehicles is a technology based on a wireless communication. The connected vehicle solution aims to provide safe, interoperable wireless network communications using vehicle to vehicle (V2V or V to V), vehicle to infrastructure (V2I) or vehicle to everything (V2X). The vehicles can communicate through an on-board device a vehicle is equipped with or a car navigation system, using wireless network communication.

SUMMARY

Aspects of the present invention are directed to a method, computer system, and computer program product for providing a user interface of travel route information.

Various embodiments are directed to a method of displaying a result of analyzing travel history of a mobile object, such as a vehicle, and a result of dynamic travel prediction of the mobile object at the same time. The method may include displaying on a map, in a superimposing manner: (i) a route on the basis of travel history; (ii) a plurality of patterns representing movement tendencies analyzed on the basis of the travel history; and (iii) a travel prediction predicted real-time on the basis of the plurality of patterns. Movement tendencies, travel prediction, and other results may be determined using machine learning using travel history as input. The method may also include calculating featured points of the travel prediction on the basis of a threshold value for probability variation in the travel prediction. In addition, the method may include generating a playback of travel data on the basis of the featured points.

According to an aspect of the present invention, a computer-implemented method for providing a user interface is provided. The method comprises providing the user interface for superimposingly displaying, on a map, a plurality of travel route patterns reflecting tendencies of movements of a moving object and new travel route predicted using the plurality of travel route patterns, wherein the plurality of travel route patterns were extracted in advance by analyzing traveling history data of the moving object and are displayed in different manners according to a prediction probability between each of the plurality of travel route patterns and the new travel route.

According to an aspect of the present invention, a computer system is provided. The computer system may include one or more computer processors, and a memory storing a program which, when executed on the processor, performs an operation for performing the method disclosed herein.

According to an aspect of the present invention, a computer program product is provided. The computer program product may comprise a computer readable storage medium having program instructions embodied therewith. The program instructions are executable by a computer to cause the computer to perform the method disclosed herein.

BRIEF DESCRIPTION OF THE DRAWING

The disclosure will provide details in the following description of preferred embodiments with reference to the following figures. The figures are not necessarily to scale. The figures are merely schematic representations, not intended to portray specific parameters of the invention. The figures are intended to depict only typical embodiments of the invention. In the figures, like numbering represents like elements.

FIGS. 9A to 9D are flowcharts depicting a method for providing a user interface in accordance with an embodiment of the present invention.

DETAILED DESCRIPTION

Figure 1:
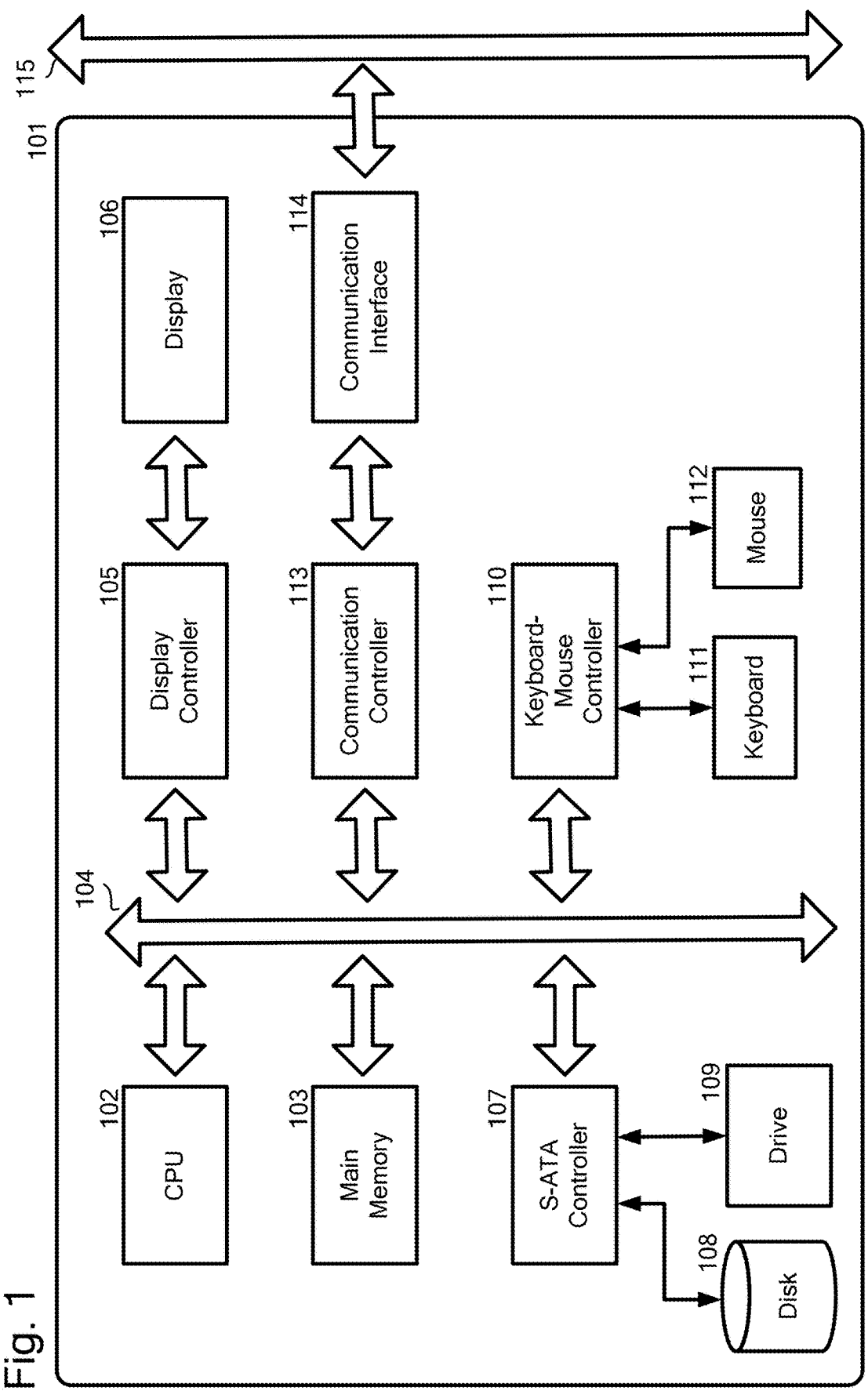
FIG. 1 is an example of a system architecture of a server computer which may be used in accordance with an embodiment of the present invention.

The descriptions of the various embodiments are presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by those of skill in the art, an embodiment of the present invention may be embodied as a method, a computer system, or a computer program product. Accordingly, an embodiment of the present invention may take the form of an entirely hardware-based embodiment, an entirely software-based embodiment, including, for example, firmware, resident software ad micro-code, and the like, or may take the form of an embodiment combining software-based and hardware-based aspects, which may be collectively referred to herein as a "circuit," a "module," or a "system".

As used herein, the expression "a/one" should be understood as "at least one." The expression "comprise(s)/comprising a/one" should be understood as "comprise(s)/comprising at least one." The expression "comprise(s)/comprising" should be understood as "comprise(s)/comprising at least." The expression "/" should be understood as "and/or."

To define more clearly terms as used herein, example definitions of terms are provided hereinafter, which should be interpreted broadly as known to a person skilled in the art or a technical field to which the present invention pertains.

As used herein, the term "a user interface" may refer to a visual part of a computer application or operating system through which a user interacts with a computer or software. According to an embodiment of the present invention, the user-interface may be implemented, for example but not limited to, in a system such as a debug system for a navigation system or a navigation system itself. The debug system may be used for debugging a machine learning model or a pattern-extracting model which may be used for a navigation system. The navigation system may be entirely on board a vehicle, or may be located elsewhere and communicate via radio or other signals with a vehicle, or they may use a combination of these methods.

As used herein, the term "map" may refer to an electronic map or digital map. The map may be a map used for a navigation system. The map may be displayed on a moving object equipped with a display or a display of any user device associated with a moving object, such as a tablet, a smartphone, or a mobile phone.

As used herein, the term "a moving object" may refer to any vehicles capable of moving. The term, "a specified moving object" may refer to any object to which an embodiment of the present invention will be applied. Hereinafter, "a (the) moving object may be interchangeably also used as a (the) specified moving object" unless otherwise provided herein. The moving object may include, for example but not limited to, any number of wheeled vehicles, such as four or more wheeled vehicles, including cars, trucks, vans, buses, and other four wheeled vehicles; two-wheeled vehicles, including motorcycles, bicycles, and other two wheeled vehicles.

The moving object are capable of communicating with a server computer through, for example, any moving object equipped with an on-board device, such as on-board a car navigation system, any user device associated with a moving object, for example, devices equipped with a GPS function, for example but not limited to, a tablet, a smartphone, a mobile phone, a GPS receiver or a pocket WiFi. Any communication method known in the art can be used for communicating between the moving object and the server computer.

The moving object may further comprise a GPS unit or any appropriate location device for obtain information on position or geolocation of the moving object itself. The appropriate location devices may be, for example, but not limited to, an electronic compass, triangulation device, radar, sonar, or a combination thereof.

The moving object may transmit traveling data to the server computer. The traveling data may comprise, for example, but not limited to, speed of a moving object, information on driving location and/or driving direction, state parameters of the automotive traveling process, identifier of a moving object or any user device associated with a moving object, or real-time, mileage and other status information. For example, the traveling data may be obtained as "car probe data" which is also referred to as probe vehicle data. The car probe data may include geographic location, movement, health status, driver information, events of interest, and more.

As used herein, the term "traveling history data" may comprise be the same as or similar to the aforesaid traveling data. The traveling history data may be collected over a predetermined period time, such as one month, a couple of months, a few months, a half year or a year. The traveling history data may be stored in a storage in a server computer or a storage accessible from the server computer.

As used herein, the term "a new travel route" may refer to a current travel route, a travel route predicted using the plurality of travel route patterns, or a combination thereof. In a case where the new travel route is a combination of the current travel route and the travel route, the new travel route may refer to a part consisting of a current travel route and a remaining part consisting of a travel route predicted using the plurality of travel route patterns.

As used herein, the term "a travel route pattern" may refer to a tendency of movements of a moving object or moving objects.

As used herein, the term "a different manner" may refer to any means to understand or visually distinguish, using one's senses, each of the plurality of travel route patterns and the new travel route. The different manners can be a type of line, a depth of color, a transparency, a gap interval of a dotted line, or a combination of thereof.

In a connected vehicle solution, sensor data may be transmitted from a vehicle to a server, and then the server analyzes the sensor data to obtain, for example, real-time traffic information, up-to-date maps or weather information or to apply the analyzed data to various solutions. In a connected vehicle solution, the sensor data is periodically transmitted from each vehicle at short intervals (e.g., once per second). Accordingly, the server can obtain the current location of the vehicle based on the periodically received sensor data.

Internet of Things (IOT) for Automotive provides a function of classifying tendencies of movements of a moving object on the basis of traveling history data of the moving object. This function is referred to as a travel pattern analysis. On the basis of a result of the travel pattern analysis, IoT for Automotive further provides a function of predicting a route through which the moving object passes starting from a given departure point to a given arrival point. This function is referred to as a travel prediction. For example, travel pattern analysis and travel prediction can be obtained using Most Probable Path & Destination Prediction models, i.e., the MPP & DP.

The inventor has recognized that, in general, if a prediction result is obtained by inputting real data to a model obtained by a machine learning, it can be difficult to understand a causal relation between the real data and the prediction result using one's senses, such as one's visual sense.

In addition, the inventor has recognized that the results of travel pattern analysis and travel prediction are not mapped on a map. Accordingly, there is a problem that it is hard for a user to visualize or otherwise understand the results. Traveling history data, analysis results, and travel prediction are provided via an application program interface (API), such as Representational State Transfer (REST). However, the data provided via the API may not be readily understandable to users such as application developers. Therefore, there is a problem that debugging of a navigation system is not easy.

Further, the inventor has recognized that it may be difficult to select parameters used for generating a model and to adjust parameters for prediction due to difficulty in understanding a causal relation among a model data, input data, and prediction results. Further, in a case where input data includes a long trip travel distance, a process for debugging of a navigation system is very difficult due to an increase in the number of check points.

Accordingly, there is a need for easily understanding a causal relation between real data and prediction results or a causal relation among a model data, input data, and prediction results.

Hereinafter, the various embodiments of the present invention will be described with reference to the accompanying Figures.

With reference now to FIG. 1, FIG. 1 is an example of a system architecture of a server computer which may be used in accordance with an embodiment of the present invention. Hereinafter, the term "a server computer" may be also simply referred to as "a server".

A server (101) may be, for example, but is not limited to, a workstation, a rack-mount type server, a blade type server, a mainframe server, or a cloud server and may run, for example, a hypervisor for creating and running one or more virtual machines. The server (101) may comprise one or more CPUs (102) and a main memory (103) connected to a bus (104). The CPU (102) may be preferably based on a 32-bit or 64-bit architecture. The CPU (102) may be, for example, but is not limited to, the Power® series of International Business Machines Corporation; the Core i™ series, the Core 2™ series, the Atom™ series, the Xeon™ series, the Pentium® series, or the Celeron® series of Intel Corporation; or the Phenom™ series, the Athlon™ series, the Turion™ series, or Sempron™ of Advanced Micro Devices, Inc. ("Power" is registered trademark of International Business Machines Corporation in the United States, other countries, or both; "Core i", "Core 2", "Atom", and "Xeon" are trademarks, and "Pentium" and "Celeron" are registered trademarks of Intel Corporation in the United States, other countries, or both; "Phenom", "Athlon", "Turion", and "Sempron" are trademarks of Advanced Micro Devices, Inc. in the United States, other countries, or both).

A display (106) such as a liquid crystal display (LCD) may be connected to the bus (104) via a display controller (105). The display (106) may be used to display, for management of the computer(s), information on a computer connected to a network via a communication line and information on software running on the computer using an appropriate graphics interface. The display may have a touch screen or a non-touch screen. The display may be for example, but not limited to, a LCD, PDP, OEL or a projection type display. A disk (108) such as a hard disk or a solid state drive, SSD, and a drive (109) such as a CD, a DVD, or a BD (Blu-ray disk) drive may be connected to the bus (104) via an SATA or IDE controller (107). Moreover, a keyboard (111) and a mouse (112) may be connected to the bus (104) via a keyboard-mouse controller (110) or USB bus (not shown).

An operating system, programs providing Windows®, UNIX®, Mac OS®, Linux®, or a Java® processing environment, Java® applications, a Java® virtual machine (VM), and a Java® just-in-time (JIT) compiler, such as J2EE®, other programs, and any data may be stored in the disk (108) to be loadable to the main memory. ("Windows" is a registered trademark of Microsoft corporation in the United States, other countries, or both; "UNIX" is a registered trademark of the Open Group in the United States, other countries, or both; "Mac OS" is a registered trademark of Apple Inc. in the United States, other countries, or both; "Linux" is a registered trademark of Linus Torvalds in the United States, other countries, or both; and "Java" and "J2EE" are registered trademarks of Oracle America, Inc. in the United States, other countries, or both).

The drive (109) may be used to install a program, such as the computer program of an embodiment of the present invention, readable from a CD-ROM, a DVD-ROM, or a BD to the disk (108) or to load any data readable from a CD-ROM, a DVD-ROM, or a BD into the main memory (103) or the disk (108), if necessary.

A communication interface (114) may be based on, for example, but is not limited to, the Ethernet® protocol. The communication interface (114), which may be connected to the bus (104) via a communication controller (113), physically connects the server (101) to a communication line (115), and may provide a network interface layer to the TCP/IP communication protocol of a communication function of the operating system of the server (101). In this case, the communication line (115) may be a wired LAN environment or a wireless LAN environment based on wireless LAN connectivity standards, for example, but is not limited to, IEEE® 802.11a/b/g/n ("IEEE" is a registered trademark of Institute of Electrical and Electronics Engineers, Inc. in the United States, other countries, or both).

Figure 2:
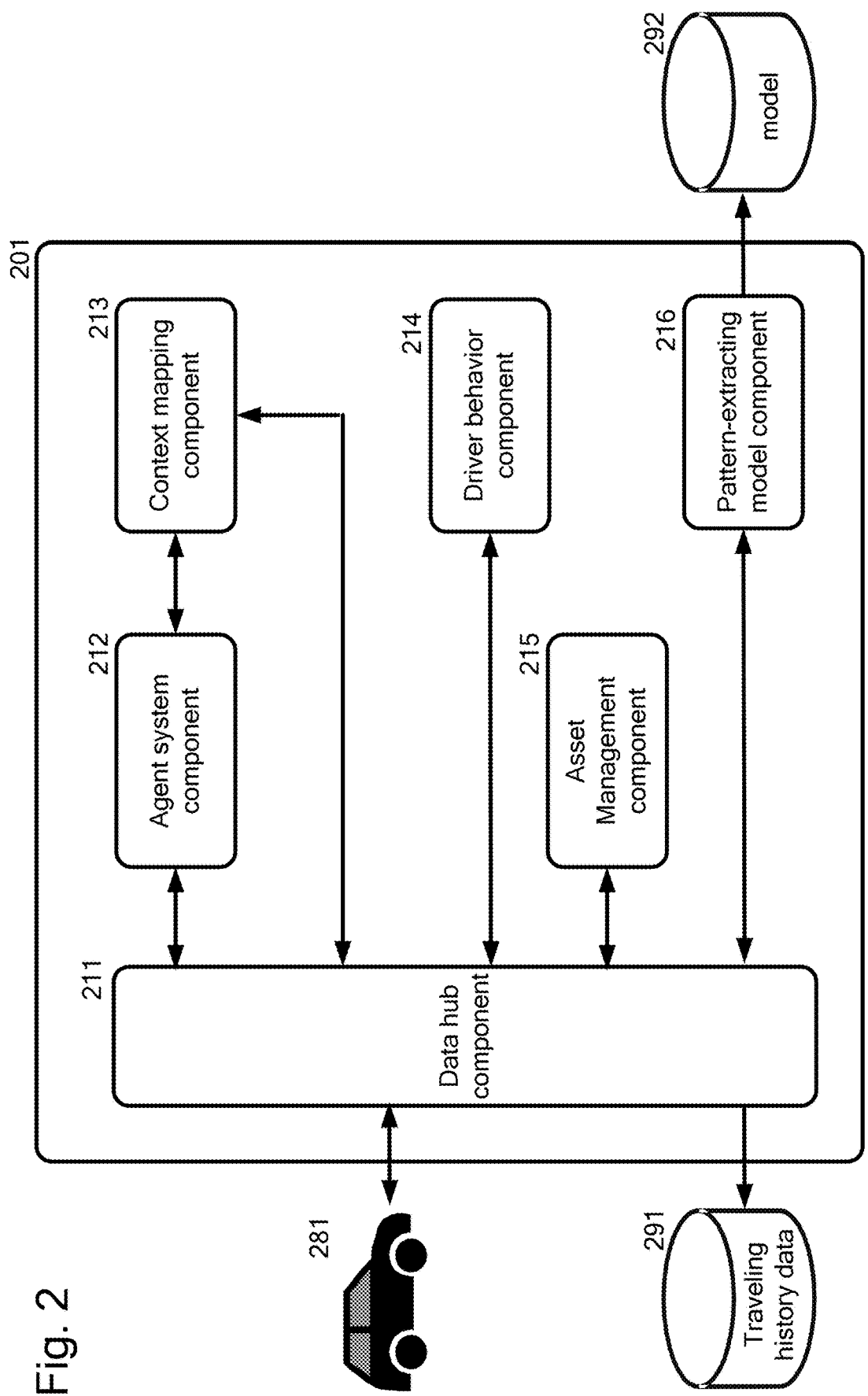
FIG. 2 is an example of a system architecture of a server computer which may be used for gathering traveling data of a moving object, storing the traveling data as traveling history data, and generating a pattern-extracting model using the traveling history data.

FIG. 2 is an example of a system architecture of a server computer which may be used for gathering traveling data of a moving object, storing the traveling data as traveling history data, and generating a pattern-extracting model using the traveling history data. The server (201) may be the same or different from the server (101) described in FIG. 1.

The server (201) may be a foundational real-time infrastructure platform that provides features to support emerging autonomous driving capabilities.

The server (201) can receive current traveling data transmitted from a moving object (281) or two or more moving objects (not shown). The traveling data may be, for example, but not limited to, car probe data.

The server (201) may comprise a data hub component (211), an agent system component (212), a context mapping component (213), a driver behavior component (214), an asset management component (215) and a Pattern-extracting model component (216).

The data hub component (211) may be a front-end component that collects and manages large volumes of moving object data from connected moving objects and automotive devices by using a range of protocols and formats. When the data hub component (211) receives data from the moving objects, the data is normalized, integrated with asset information, and then dispatched to other components such as the context mapping component (213) and the driver behavior component (125), both internal and external. When the data hub component (211) receives car probe data from a moving object, the data hub component (211) may dispatch the car probe data to the Pattern-extracting model component (216) and further may store the car probe data in a traveling history data storage (291).

The agent system component (212) may detect, store, and manage events that are related to moving objects, driving activity, and movement. The agent system component (212) manages moving objects which are now driving as an agent. The agent system component (212) is integrated with the mapping system. Events are determined by predefined and customized rules that are created in the system. The agent system component (212) sends and receives data from other components of the IoT for Automotive.

The context mapping component (213) may provide geo-spatial functions, including map matching, road geometry data retrieval, shortest path search for global road networks, and real-time traffic event manipulation. The map matching is used for matching the raw GPS location coordinates from a moving object to the coordinates of the actual mapped road network. The road geometry data retrieval is used for retrieving the mapped road network to draw road shapes on a map. The shortest path search for global road networks is used for searching for the shortest route that incorporates real-time events such as traffic delays and incidents. The real-time traffic event manipulation is used for adding real-time map-matched events, such as traffic conditions, to improve route planning results.

The driver behavior component (214) may analyze driver behavior data from a connected moving object or automotive device together with geospatial contextual data. By using the API service, the analyzed driver data can be integrated with automotive applications to gain valuable insights into driving behavior and moving object usage patterns. The driver behavior component (214) may also provide a service for analyzing the geographical movement of moving objects and route patterns of journeys. A trajectory pattern of the journey is generated and analyzed to provide insights into movement of a moving object.

The asset management component (215) may provide asset management capabilities for managing moving objects, drivers, and the relationships between them. Assets define the different moving object data types that are related to moving object devices that you want to connect to the system. Assets also define the environmental data about drivers, map sources, geographical areas, analytic rules, events, and other things that are meaningful to the connected car ecosystem.

The Pattern-extracting model component (216) may generate a pattern-extracting model using the car probe data of a moving object or moving objects. The pattern-extracting model can be a machine learning model and used for extracting a plurality of travel route patterns reflecting tendencies of movements of a moving object or moving objects. The machine learning model may be an unsupervised learning algorithm. The pattern-extracting model may be stored in model storage (292).

Note that before a Most Probable Path & Destination Prediction (MPP & DP) prediction model is generated, a travel pattern analysis may be required to extract a plurality of travel route patterns by analyzing plural sets of traveling history data of a moving object. Each traveling history data may comprise travel history data and a plurality of travel route patterns.

The Pattern-extracting model component (216) may extract one or more pattern-extracting models by analyzing plural sets of traveling history data of a moving object or moving objects. Each of the plural sets of traveling history data of a moving object or moving objects may comprise travel history data and a plurality of travel route patterns.

The Pattern-extracting model component (216) generates the pattern-extracting model in advance before carrying out an embodiment of the present invention. The pattern-extracting model may be an MPP & DP model.

The Most Probable Path (MPP) will be briefly explained below by referring to FIG. 3.

Figure 3:
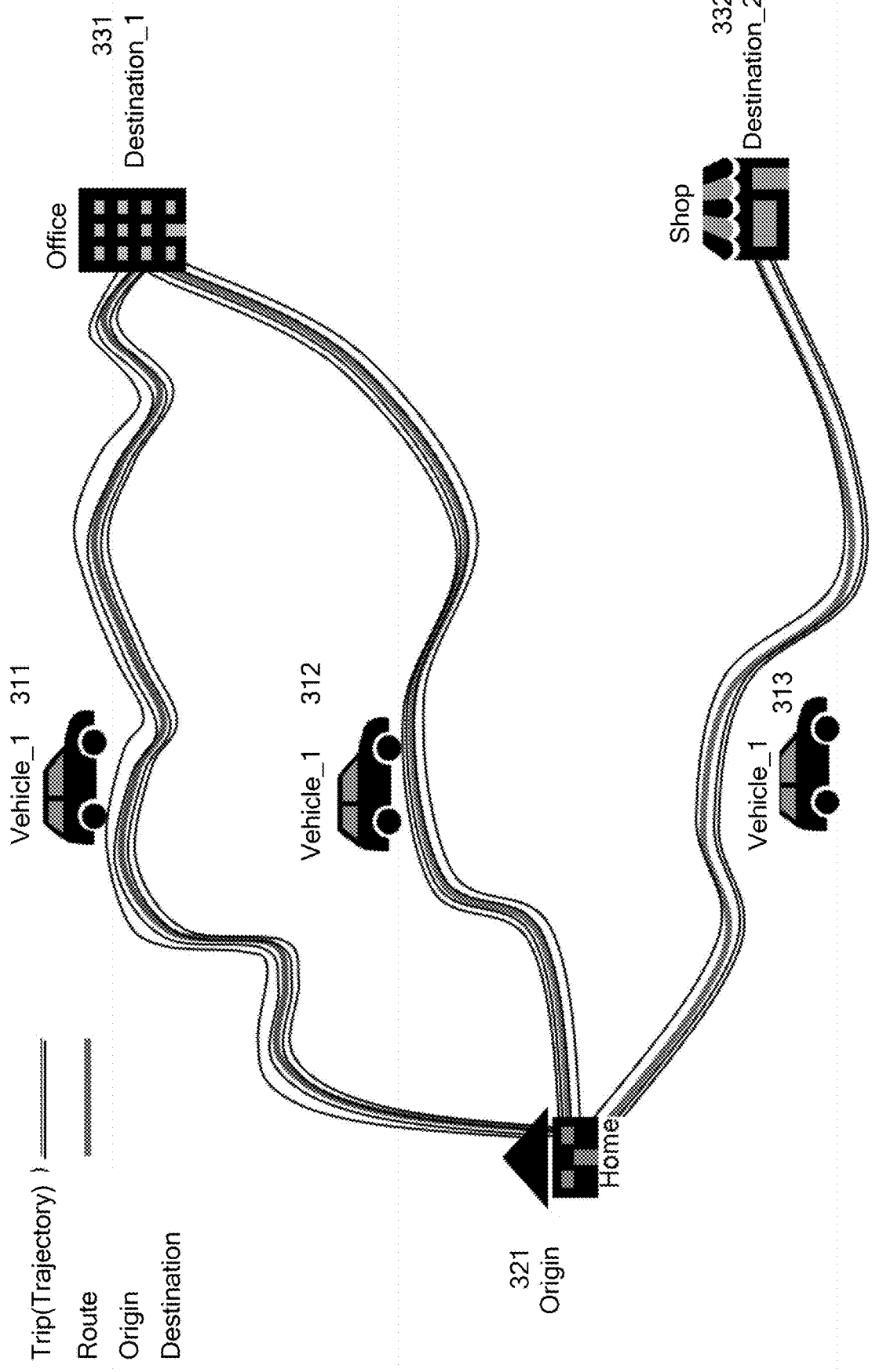
FIG. 3 is a block diagram depicting a method of most probable path prediction (MPP) which may be used in an embodiment of the present invention.

FIG. 3 is a block diagram depicting a method of the MPP which may be used in an embodiment of the present invention. FIG. 3 illustrates three trajectory route patterns (e.g., the route patterns that Vehicle_1 (311), Vehicle_1 (312) and Vehicle_1 (313) are driving on). One route may be from an origin (321), for example, a home, to a destination_1 (331) or an office. Another route may be from origin (321) to a destination_1 (331). One other route pattern may be from the origin (321) to an alternate destination_2 (332), such as a shop.

The server may choose at least one route among the aforesaid trajectory route patterns, based on a context, for example, but not limited to, such as day of the week, week day or weekend, a time zone, time duration, traffic, weather, road attributes, and/or road situation, or a combination thereof, while referring to current traveling data.

The following FIGS. 4 to 7 show a screen on which a plurality of travel route patterns and a new travel route are superimposingly displayed according to an embodiment of the present invention. The terms, "a new travel route" and "a travel route pattern", are defined above. While the terms "superimposingly" and "superimpose" are used to described various embodiments, it should be understood that it is not required in all embodiments that any particular item of information be placed partially or completely over another; these terms are intended to encompass any context in which travel route patterns, a new travel route, prediction probability history, current travel data, parameter data, and similar information may be viewed simultaneously or in time-overlapping periods on the same display screen.

Figure 4:
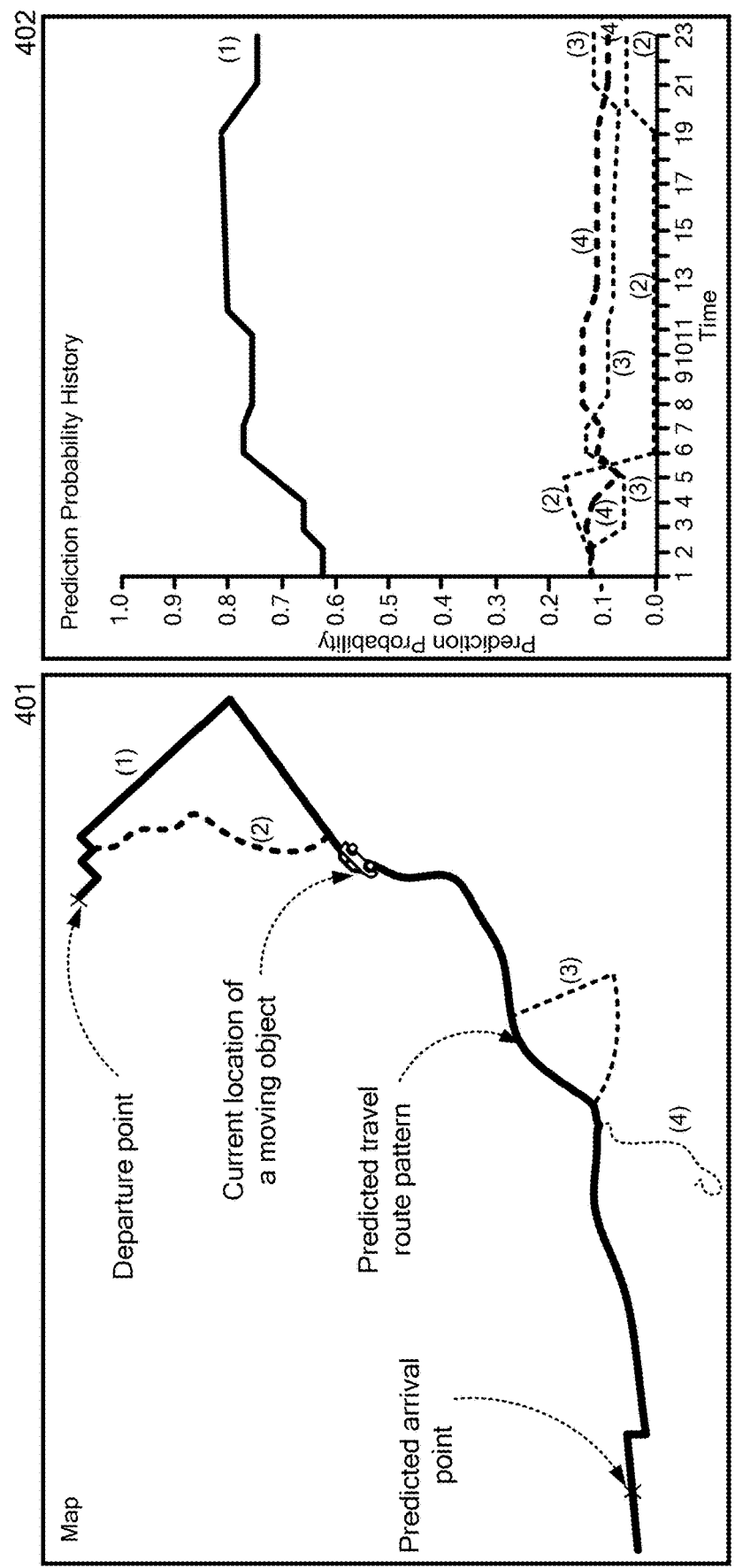
FIG. 4 shows a screen superimposingly displaying a plurality of travel route patterns and a new travel route as well as prediction probability history, according to an embodiment of the present invention.

The screens described in FIG. 4 shows superimposition display which can be used for a system such as a debug system for a navigation system or a navigation system itself.

In debug system embodiments, the screens described herein may be used for debugging a system, such as a navigation system, e.g., the screens may be used to change or select a parameter associated with a plurality of travel route patterns, a parameter associated with a new travel route, or a parameter associated with current traveling data. The parameter associated with a plurality of travel route patterns may be, for example, but not limited to, a parameter for a context or a parameter for travel history data. The parameter associated with a new travel route may be, for example, but not limited to, the number of travel histories.

A user can change or select a parameter in order to recalculate a prediction probability between each of the plurality of travel route patterns and the new travel route. This allows the user to debug a navigation system, especially a machine learning model or a pattern-extracting model which may be used for a navigation system.

In navigation system embodiments, the screens maybe used for searching a traveling route at the time when a user searches for a travel route pattern in advance, for example, prior to starting driving. A user can change or select a parameter in order to recalculate a prediction probability between each of the plurality of travel route patterns and the new travel route. This allows the user to let the navigation system show another or other traveling routes.

FIG. 4 shows a screen superimposingly displaying a plurality of travel route patterns and a new travel route as well as prediction probability history, according to an embodiment of the present invention.

Let us suppose that a map (401) and prediction probability history (402) are now displayed on a screen. It may be possible to initially display only the map (401) and later display the prediction probability history (402) in response to an instruction from a user to display the prediction probability history (402).

The screen is now superimposingly displaying new travel route (1) and plurality of travel route patterns (2), (3) and (4) on the map (401). Further, the screen is now displaying the current location of a moving object using an icon, such as a car icon. Predicted routes are each presented such that prediction probability of the route is easily understandable on the basis of properties of a line representing the route, such as a depth of color, a transparency, a gap interval of a dotted line.

The departure point of the new travel route (1) is the same as that of the travel route patterns (2) to (4). The predicted arrival point of the new travel route (1) is the same as that of the travel route patterns (2) and (3), but different from that of the travel route pattern (4).

The new travel route (1) is indicated with the thick line (1). The travel route pattern (2) is indicated with the thick dotted line (3). The travel route pattern (3) is indicated with the middle dotted line (3). The travel route pattern (4) is indicated with the thin dotted line. Thus, the line of the new travel route (1) is now displayed in different manners, compared with each line of the travel route patterns (2) to (4). Also, the lines of the travel route patterns (2) to (4) are now displayed in different manners with respect to each other. The different manners can be automatically selected according to a prediction probability between each of the plurality of travel route patterns and the new travel route. The different manners of display can allow a user to understand using one's senses or to visually distinguish the new travel route (1) and the travel route patterns (2) to (4).

The screen shows the prediction probability history (402) in a window which may be different window of the map (401). The prediction probability history (402) shows time or time stamp at x axis and a prediction probability per predicted route at y axis. The numerals (1), (2), (3) and (4) adjacent to each line correspond to the new travel route (1) and the travel route patterns (2) to (4), respectively. The probability per predicted route will change along a time axis according to a parameter associated with a plurality of travel route patterns, a parameter associated with the new travel route, or a parameter associated with current traveling data.

Figure 5:
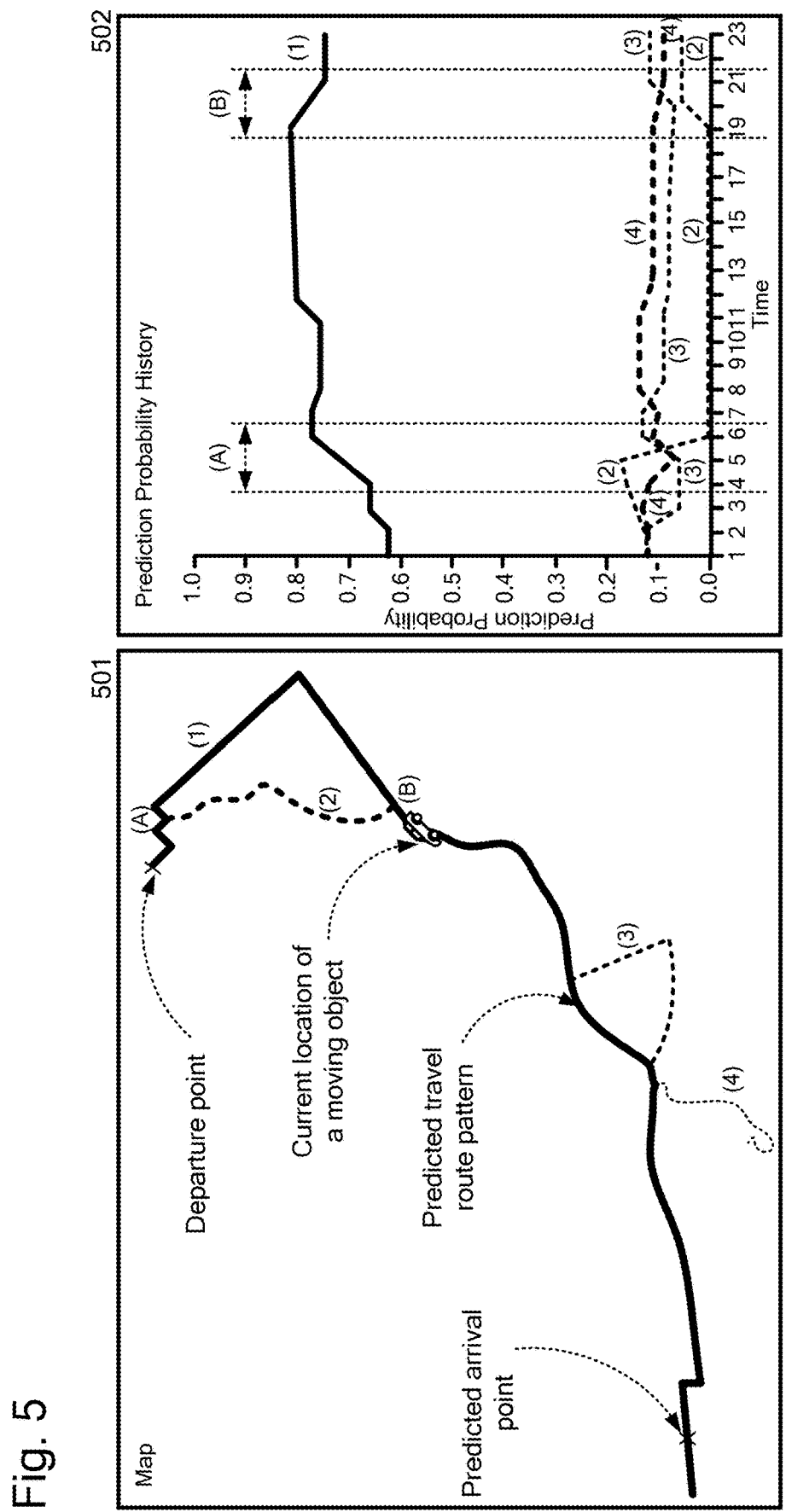
FIG. 5 shows a screen superimposingly displaying a plurality of travel route patterns and a new travel route as well as prediction probability history with a feature point reflecting a changing point of the variation of the prediction probability, according to an embodiment.

FIG. 5 shows a screen superimposingly displaying a plurality of travel route patterns and a new travel route, as well as prediction probability history, with feature points, each reflecting a changing point of the variation of the prediction probability.

Let us suppose that a map (501) and prediction probability history (502) are now displayed on a screen. The map (501) corresponds to the map (401) described in FIG. 4. The prediction probability history (502) corresponds to the prediction probability history (402) described in FIG. 4.

The prediction probability history (502) shows the feature points (A) and (B) in a certain periods. As seen in the map (501), the feature point (A) represents a changing point of the variation of the prediction probability and the variation of the prediction probability changes due to a place where a part of the new travel route (1) overlaps with a part of the travel route pattern (2). As show in map (501), the prediction probabilities for both new travel route (1) and travel route pattern (2) changes at feature point (A). Similarly, as seen in the map (501), the feature points (B) represents a changing point of the variation of the prediction probability and the variation of the prediction probability changes due to a place where a part of the new travel route (1) overlaps with a part of the travel route pattern (2). The prediction probabilities for both new travel route (1) and travel route pattern (2) changes at feature point (B). The prediction probability history (502) can allow a user to understand using one's senses or visually distinguish the new travel route (1) and the travel route patterns (2) to (4) using a graph having an x-axis representing times and a y-axis representing a prediction probability.

Figure 6:
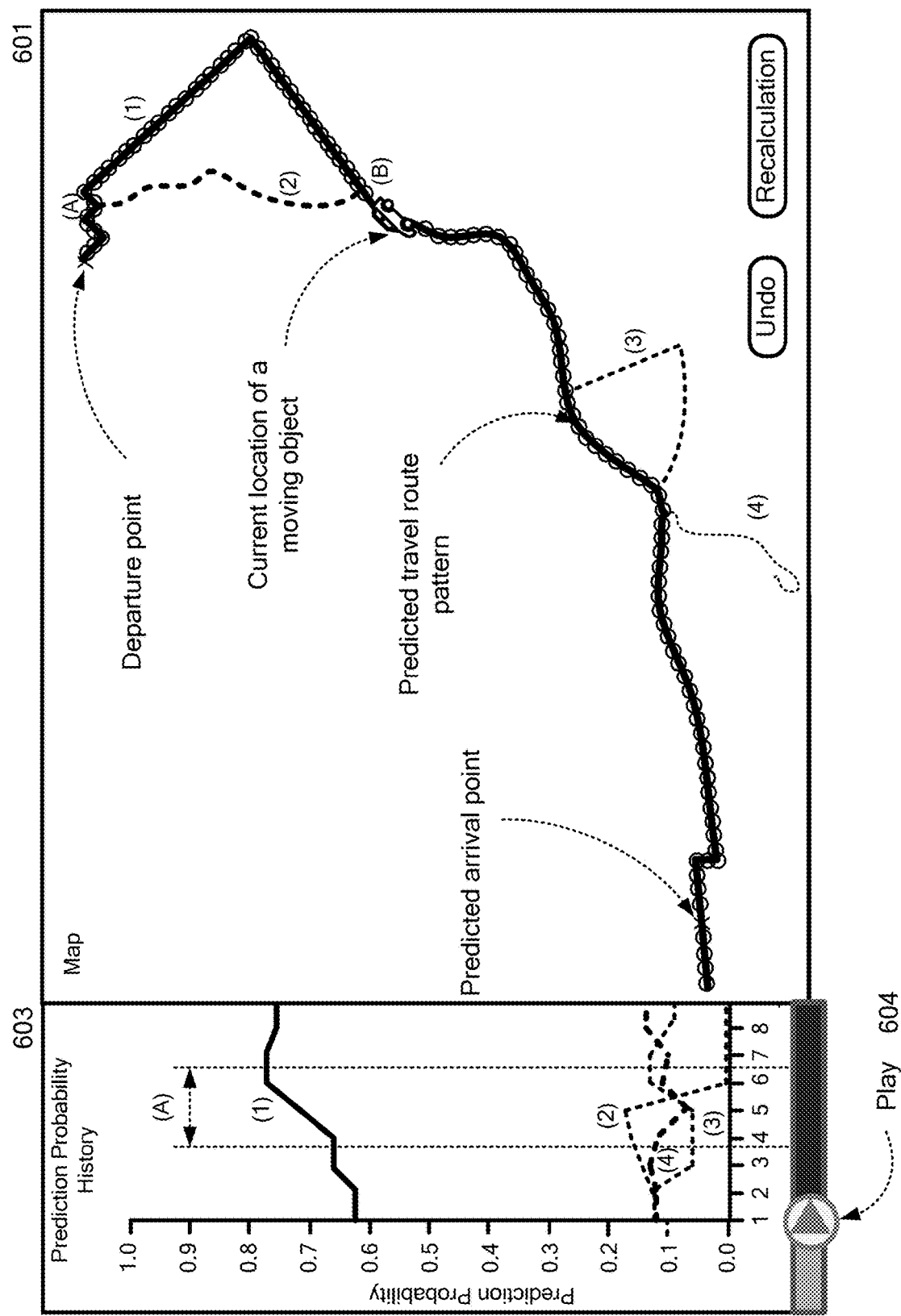
FIG. 6 shows a screen superimposingly displaying a plurality of travel route patterns and a new travel route as well as the playback along a time axis after adjusting values of the new travel route, according to an embodiment.

FIG. 6 shows a screen superimposingly displaying a plurality of travel route patterns and new travel route as well as the playback along a time axis after adjusting values of the new travel route.

Let us suppose that a map (601) and a play window (603) are now displayed on a screen.

The map (601) corresponds to the map (401) described in FIG. 4. Further, the map (601) shows continuous circles directly on the new travel route (1). The continuous circles represent a change of new travel route (i.e., Drag & Drop trajectory change) and a result after recalculation of a prediction probability between each of the plurality of travel route patterns and the new travel route using a changed or selected parameter associated with a plurality of travel route patterns, a parameter associated with the new travel route, or a parameter associated with current traveling data. The changing of the aforesaid parameters can be done automatically or manually as described in FIG. 8 below.

The play window (603) corresponds to a part of the prediction probability history (502) described in FIG. 5, but is different from the prediction probability history (502) in that the play window (603) further shows a play icon (604).

The play window (603) shows a part of probability per predicted route along a time axis, especially around the feature point (A). If a user presses the play icon (604) such as a play button, the playback along a time axis is being displayed on the map (601) using playback data. As time passes along a time axis, a change of new travel route is being displayed sequentially.

Feature points will be automatically extracted or determined using a threshold value of variation of the prediction probability. Feature points may be automatically extracted or determined when a new travel route or a travel route pattern, or both a new travel route or a travel route pattern, exceed the threshold value. Accordingly, playback data is automatically updated to display the playback along a time axis sequentially.

Figure 7:
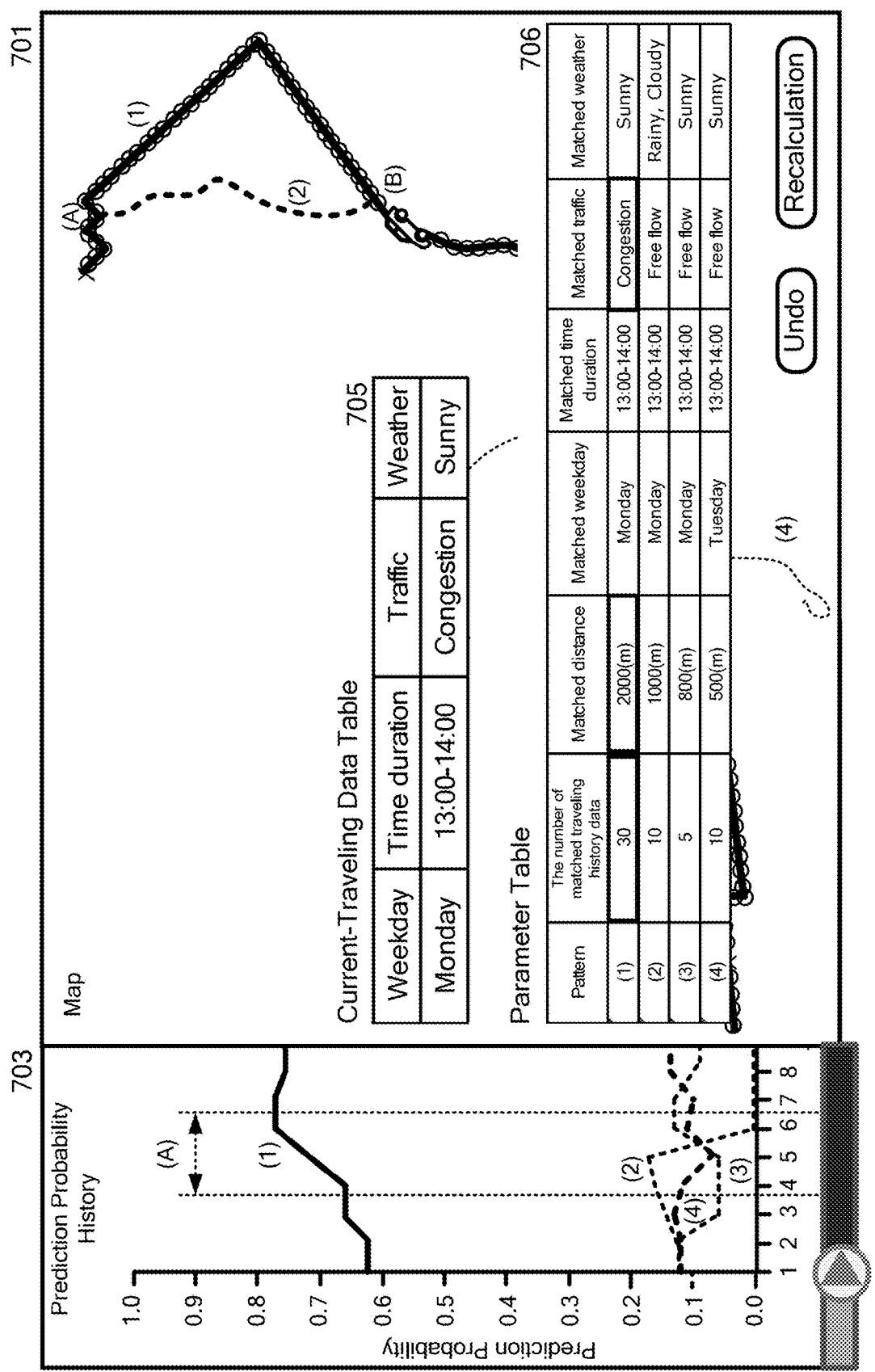
FIG. 7 shows a screen superimposingly displaying a plurality of travel route patterns and a new travel route as well as a parameter associated with a plurality of travel route patterns, a parameter associated with the new travel route, or a parameter associated with current traveling data, according to an embodiment.

FIG. 7 shows a screen which is now superimposingly displaying a plurality of travel route patterns and a new travel route, as well as a parameter associated with a plurality of travel route patterns, a parameter associated with the new travel route, or a parameter associated with current traveling (current trip) data.

Let us suppose that a map (701) and a play window (703) are now displayed on a screen. The map (701) corresponds to the map (601) described in FIG. 6. The play window (703) corresponds to the play window (603) described in FIG. 6.

The screen shows a current-traveling data table (705) and a parameter table for a pattern-extracting model (706), for example, on the map (701), or at various other locations on or adjacent to the map (701).

The current-traveling data table (705) may comprise context data. The context data may be any parameters for traveling data such as parameters in car probe data. The current-traveling data table (705) shows the following parameters for a current trip: "Weekday"; "Time duration"; "Traffic"; and "Weather".

The parameter table (706) may comprise any parameters used for a pattern-extracting model. The parameter table (706) may be displays at various locations on or adjacent to the map (701). The parameter table (706) shows the following parameters: "Identifier for a travel route pattern"; "The number of matched traveling history data"; "Matched distance"; "Matched weekday"; "Matched time duration"; "Matched traffic"; and "Matched weather".

In the parameter table (706), a parameter(s) having a high contribution to a prediction probability is(are) automatically highlighted, for example, by surrounding characters with a frame, by making the characters bold, or in another suitable highlighting manner. In the parameter table (706), the following parameters for identifier for travel route pattern (1) are highlighted by surrounding characters with a frame: The number of matched traveling history data; Matched distance; and Matched traffic.

Figure 8:
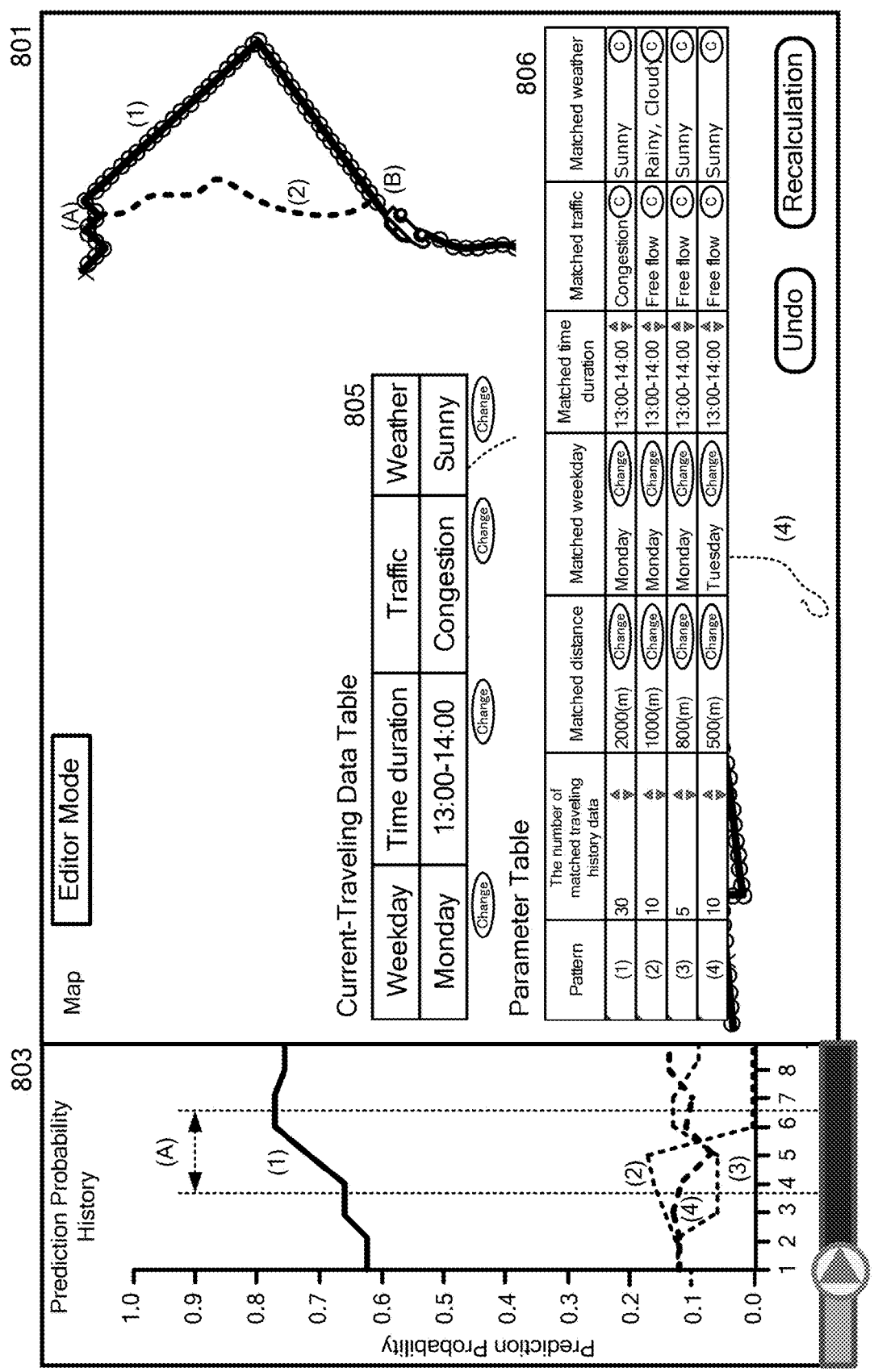
FIG. 8 shows a screen superimposingly displaying a plurality of travel route patterns and a new travel route as well as a change or selection of a parameter associated with a plurality of travel route patterns, a parameter associated with the new travel route, or a parameter associated with current traveling data, according to an embodiment.

FIG. 8 shows a screen which is now superimposingly displaying a plurality of travel route patterns and a new travel route, as well as a change or selection of a parameter associated with a plurality of travel route patterns, a parameter associated with the new travel route or a parameter associated with current traveling data.

Let us suppose that a map (801) and a play window (803) are now displayed on a screen. The map (801) corresponds to the map (701) described in FIG. 7. The play window (803) corresponds to the play window (703) described in FIG. 7.

A current-traveling data table (805) corresponds to the current-traveling data table (705). Icons for changing or selecting parameters displayed on the current-traveling data table (805) may be rendered at various locations on or adjacent to particular data items in the current-traveling data table (805). The change icons are shown as an oval with the word "change" appearing within the oval.

A parameter table for a pattern-extracting model (806) corresponds to the parameter table (706) described in FIG. 7. Icons for changing or selecting parameters displayed on the parameter table (806) may be rendered at various locations on or adjacent to particular parameters in the parameter table (806). The change icons are shown as an oval with the word "change" appearing within the oval.

The change icons allow a user to change or select data or a parameter in order to recalculate a prediction probability between each of the plurality of travel route patterns and the new travel route. In response to changing or selecting a data time or parameter, the prediction probability is recalculated and the display may be updated.

FIGS. 9A to 9D are flowcharts depicting a method for providing a user interface in accordance with an embodiment of the present invention.

In various embodiments, each step in FIGS. 9A to 9D may be one or more operations performed a computer. In an embodiment, a subject of each step may be the server (101) in a case where the user-interface may be implemented, for example, in a debug system for a navigation system or in a navigation system itself. The server (101) can be connected to the debug system or navigation system through a network, such as a wired or wireless network. In the following, the server (101) may be mentioned as the subject of each step in FIGS. 9A to 9D for ease of explanation.

Figure 9A:
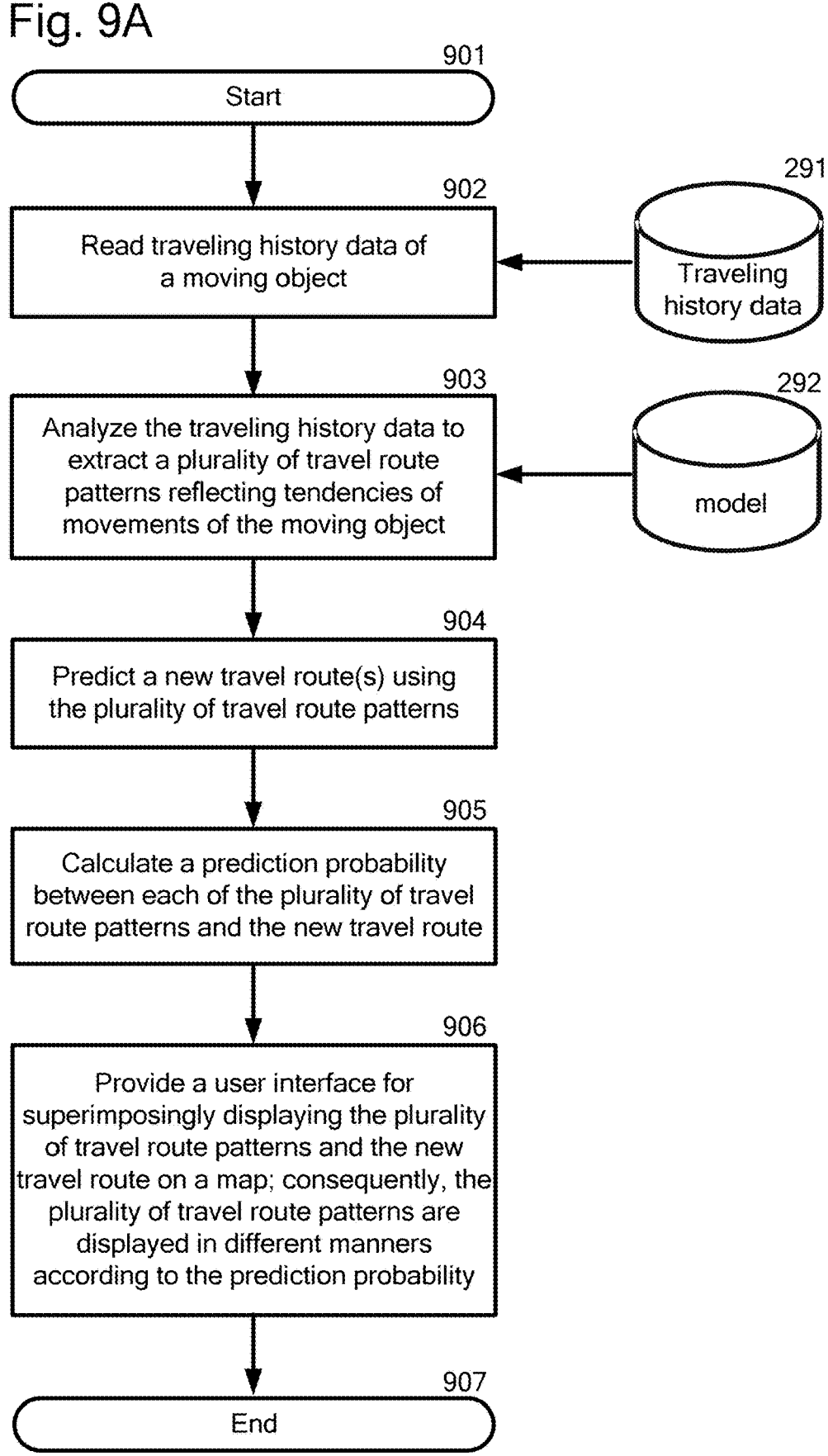

FIG. 9A illustrates a flowchart depicting a method for providing a user interface in accordance with an embodiment of the present invention.

Let us suppose that a moving object transmits current traveling data to the server (101) through a wireless network. The moving object may obtain the current traveling data using a navigation system with which the moving object itself is equipped, or a smartphone, a tablet, or a cellular phone equipped with a GPS unit. Alternatively, the current traveling data may be obtained from an engine control unit (i.e., ECU). The ECU may be any vehicle control system, for example, but not limited to, a braking control system, a throttle control system, a steering control system, or a body control system. The ECU may include an advanced driver assistance system (i.e., ADAS) functions that automate, adapt, or enhance vehicle systems in order to increase vehicle safety and/or operator driving performance. For example, the ECU may include ADAS technologies that alert drivers to potential problems or to avoid collisions by implementing safeguards, such as autonomously controlling the vehicle. The ECU may also include ADAS features that enhance certain systems, such as automated lighting, automated parking, adaptive cruise control, automated braking, or improved blind spot elimination using camera technology. The ECU can also parse commands an action, such as an ADAS function in order to process the image data, the information on position and the any data obtained from another or other vehicles.

At step 901, the server (101) starts the process for providing a user interface. Let us suppose that the traveling history data storage (291) described in FIG. 2 stores traveling history data of a specified moving object or a plurality of moving objects, and that the model storage (292) described in FIG. 2 stores the pattern-extracting model (292).

At step 902, the server (101) reads the traveling history data of the moving object from the storage (291) or a storage accessible from the server (101).

At step 903, the server (101) analyzes the traveling history data of the moving object to extract a plurality of travel route patterns reflecting tendencies of movements of the moving object. Each of the plurality of travel route patterns is associated with a representative route.

The extraction of the plurality of travel route patterns can be carried out by clustering departure points and arrival points, respectively, in plural sets of traveling history data of a moving object, and further clustering the traveling data in the plural sets of traveling history data according to the similarity degree of the traveling data. The former clustering enables grouping of points neighboring departure points and arrival points, respectively. The results of the clusterings are patterned data of the travel route patterns and are used for extracting a plurality of travel route patterns using a pattern-extracting model as the machine learning model.

The server (101) then inputs the results of the clusterings and traveling history data to the pattern-extracting model (292) to output an analysis result. The pattern-extracting model (292) can be configured to output a plurality of travel route patterns reflecting tendencies of movements of a moving object with their probability. The analysis result may be a plurality of travel route patterns reflecting tendencies of movements of the moving object.

At step 904, the server (101) predicts a new travel route(s) using the plurality of travel route patterns.

For example, the server (101) converts the plurality of travel route patterns to a list of Link ID on a map. Then, the server (101) selects travel route patterns having the similar Link ID from the plurality of travel route patterns in order to filter the plurality of travel route patterns. The server (101) then picks up the representative routes as new travel routes from the selected travel route patterns. As stated above, each travel route pattern is associated with a representative route.

The Link ID may be a unique identifier that uniquely determines a road on a map data. For example, Link ID shows each of up and down roads. In a case where Link ID is associated with both of up and down roads, a direction of road (i.e., up or down) is further added to this Link ID to make Link ID for each of up and down roads unique.

At step 905, the server (101) calculates a prediction probability between each of the plurality of travel route patterns and the new travel route. The calculation of the prediction probability can be carried out by calculating the matching degrees between each of the plurality of travel route patterns and the new travel route. In a case where a plurality of new travel routes are predicted in step 904, the calculation of the prediction probability can be carried out by calculating the matching degrees between each of the plurality of travel route patterns and each of the plurality of the new travel routes.

For the calculation of the prediction probability, the list of Link ID which was converted from the plurality of travel route patterns is used. Further, the server (101) converts the new travel route to a list of Link ID on the aforesaid map. Then, the server (101) calculates the matching degrees between the list of Link ID converted from the plurality of travel route patterns and the list of Link ID converted from the new travel route. The server (101) then calculates the prediction probability according to the matching degrees. In a case where a plurality of new travel routes are picked up in step 904, the server (101) calculates each prediction probability for each of the plurality of new travel routes.

The following model data used for the pattern-extracting model (292) will influence the calculation of a prediction probability: (A) Travel pattern route; (B) Metrics; (C) Context as defined above; and (D) Hidden Markov Model.

(A) The travel pattern route may be a list of "Direction+ Link ID".

(B) The metrics may be the number of matched traveling history data; average travel distance of matched historical trips; and average travel time of matched historical trips.

(C) The Context may be those as defined above.

(D) The Hidden Markov Model can be used for calculating a probability of a transition from each link (Direction+ Link ID) to a travel route pattern; and a probability of a transition from each context to a travel route pattern and then making the pattern-extracting model (292).

At step 906, the server (101) provides a user interface for superimposingly displaying, the plurality of travel route patterns and the new travel route on a map.

The server (101) may provide the user interface to a system where the user interface is implemented. The system may be, for example but not limited to, a debug system for a navigation system or a navigation system itself.

The system implements the user interface and then superimposingly displays the plurality of travel route patterns and the new travel route on a map. Further, the system displays the plurality of travel route patterns in different manners according to the prediction probability. The different manners are carried out using any technique known in the art, for example, but not limited to, the depth of color, the degree of transparency, or a gap interval of a dotted line.

At step 907, the server (101) terminates the aforesaid process.

According to an embodiment of the method described in FIG. 9A, a user can visually understand a causal relation between the real data and the prediction result. This may result in ease of debugging in the debug system.

In the above explanations of the steps 901 to 907, the traveling history data of the specific moving object are used. If only the traveling history data of the moving object is used, the traveling history data of the moving object as well as a plurality of travel route patterns extracted by analyzing the traveling history data of the moving object are used to carry out the steps described in FIG. 9A. The server (101) may further configure the user interface such that the superimposing displaying further comprises displaying at least one route on the basis of traveling history data obtained from the moving object. By using the traveling history data of the specific moving object only, the extracted plurality of travel route patterns are specific to this specific moving object.

In the above explanations of the steps 901 to 907, traveling history data of plural moving objects can be used instead of only the traveling history data of a single moving object. If the traveling history data of the plural moving objects is used, the traveling history data of the plural moving objects as well as a plurality of travel route patterns extracted by analyzing the traveling history data of the plural moving objects can be used to carry out the steps described in FIG. 9A. If the traveling history data of the plural moving object is used, the user-interface may be also implemented in, for example, but not limited to, a system such as a debug system for a navigation system or a navigation system itself. The server (101) may also further configure the user interface such that the superimposing displaying further comprises displaying at least one route on the basis of the traveling history data obtained from the plural moving objects. By using the traveling history data of the moving objects, the extracted plurality of travel route patterns are general to any moving objects.

FIG. 9B illustrates a flowchart depicting a method for configuring the user interface such that superimposing displaying further comprises displaying the playback using the playback data along a time axis.

At step 911, the server (101) starts the process for configuring the user interface.

At optional step 912, the server (101) allows a user to change or select a parameter for extracting a feature point. This allows a user to change or select the aforesaid parameter, if necessary. The change or selection of the parameter can be made, for example, but not limited to, through inputting value to a box or window, sliding a slider scale, or selecting a button.

At optional step 913, the server (101) extracts or determines, using a threshold value of variation of the prediction probability calculated at the aforesaid step 905, a feature point reflecting a changing point of the variation of a prediction probability for at least one of a new travel route or a travel route pattern. The feature point may be determined based on a variation of a prediction probability exceeding a threshold, at a place where a part of a new travel route overlaps with a part of a travel route pattern, or both.

The feature point may be, for example, but not limited to, classified into the following two groups: (1) a feature point in relation with a prediction probability, and (2) a feature point in relation with traveling data including traveling history data.

With respect to prediction probability—group (1), the feature point in relation with a prediction probability may be, for example, but not limited to, as follows: (a) when a rank of travel route patterns in accordance with a prediction probability for a destination or a route has changed; (b) when absolute values of variations in the prediction probability for a destination or a route in a certain period of time are summed up and a result of the sum exceeds a predefined threshold value; or (c) when a new destination or route prediction that has not yet appeared is observed.

With respect to traveling data—group (2), the feature point in relation with traveling data including traveling history data may be, for example, but not limited to, as follows: (a) when a context, such as day of the week, week day or weekend, a time zone, time duration, traffic, weather, road attributes, and/or road situation or a combination thereof, specified by a user is observed; (b) when a road or road type specified by a user is observed; or (c) when a traveling behavior specified by a user is observed. The traveling behavior may be a behavior of a moving object caused by a user's driving. The traveling behavior may be, for example, but not limited to, sudden starting or braking, relatively high frequency of braking or acceleration, sudden acceleration before a curve or while in a curve, sudden lane-changing, or driving over a particular speed.

In various embodiments, a feature point may be extracted or determined based, wholly or in part, on the above classifications.

If the aforesaid optional step 912 is carried out, the server (101) may extract a feature point using the changed or selected parameter.

The aforesaid threshold value can be arbitrarily set by a user, such as an administrator of the user interface.

At step 914, the server (101) generates playback data of the new travel route using the feature point extracted at step 913. The playback data can be used at the next step 915 in order to display, on the screen, playback of the superimposingly displaying along time axis. The playback data may be generated along time axis and around a time where the feature point exists.

At step 915, the server (101) configures the user interface such that the superimposing displaying further comprises displaying the playback using the playback data along a time axis. The user interface may be especially configured such that the playback is carried out along a time axis and around a time where the feature point exists.

At step 916, the server (101) terminates the aforesaid process.

According to an embodiment of the flowchart described in FIG. 9B, a user can visually understand the detailed analysis of the feature point by displaying the playback.

FIG. 9C illustrates a flowchart depicting a method for configuring the user interface such that superimposing displaying further comprises displaying a plurality of recalculated travel route patterns in different manners according to recalculated prediction probabilities.

At step 921, the server (101) starts the aforesaid process.

At step 922, the server (101) allows a user to change or select a parameter associated with a plurality of travel route patterns, a parameter associated with the new travel route, or a parameter associated with current traveling data. This allows a user to change or select the aforesaid parameter, if necessary. The change or selection of the parameter can be made, for example, but not limited to, through inputting a value to a box or window, sliding a slider scale, or selecting a button.

At step 923, the server (101) recalculates a prediction probability between each of the plurality of travel route patterns and the new travel route using the changed or selected parameter, as the same manner in step 905 described in FIG. 9A.

At step 924, the server (101) configures the user interface such that the superimposing displaying further comprises displaying a plurality of recalculated travel route patterns in different manners according to the recalculated prediction probability, instead of displaying the travel route patterns at step 906 described in FIG. 9A, or displaying the travel route patterns displayed just before the display of recalculated travel route patterns.

At step 925, the server (101) terminates the aforesaid process.

According to an embodiment of the method described in FIG. 9C, a user can easily select parameters for generating a model and adjust parameters for prediction.

FIG. 9D illustrates a flowchart depicting a method for configuring the user interface such that superimposing displaying further comprises displaying variation of the prediction probability in a format of a comparative manner. The comparative manner is carried out, for example, but not limited to, in a format of a table.

At step 931, the server (101) starts the aforesaid process.

At step 932, the server (101) copies values of the travel route in a memory and then adjusts the values stored in the memory.

At step 933, the server (101) configures the user interface such that the superimposing displaying further comprises displaying variations of the prediction probability in a format of a comparative manner. Then, the server (101) provides the configured user interface to a system where the user interface is implemented. The system may be, for example but not limited to, a debug system for a navigation system or a navigation system itself. The format may be, for example, but not limited to, a table or a graph.

At step 934, the server (101) terminates the aforesaid process.

According to an embodiment of the flowchart described in FIG. 9D, a user can visually understand parameters in a comparative manner.

Figure 10:
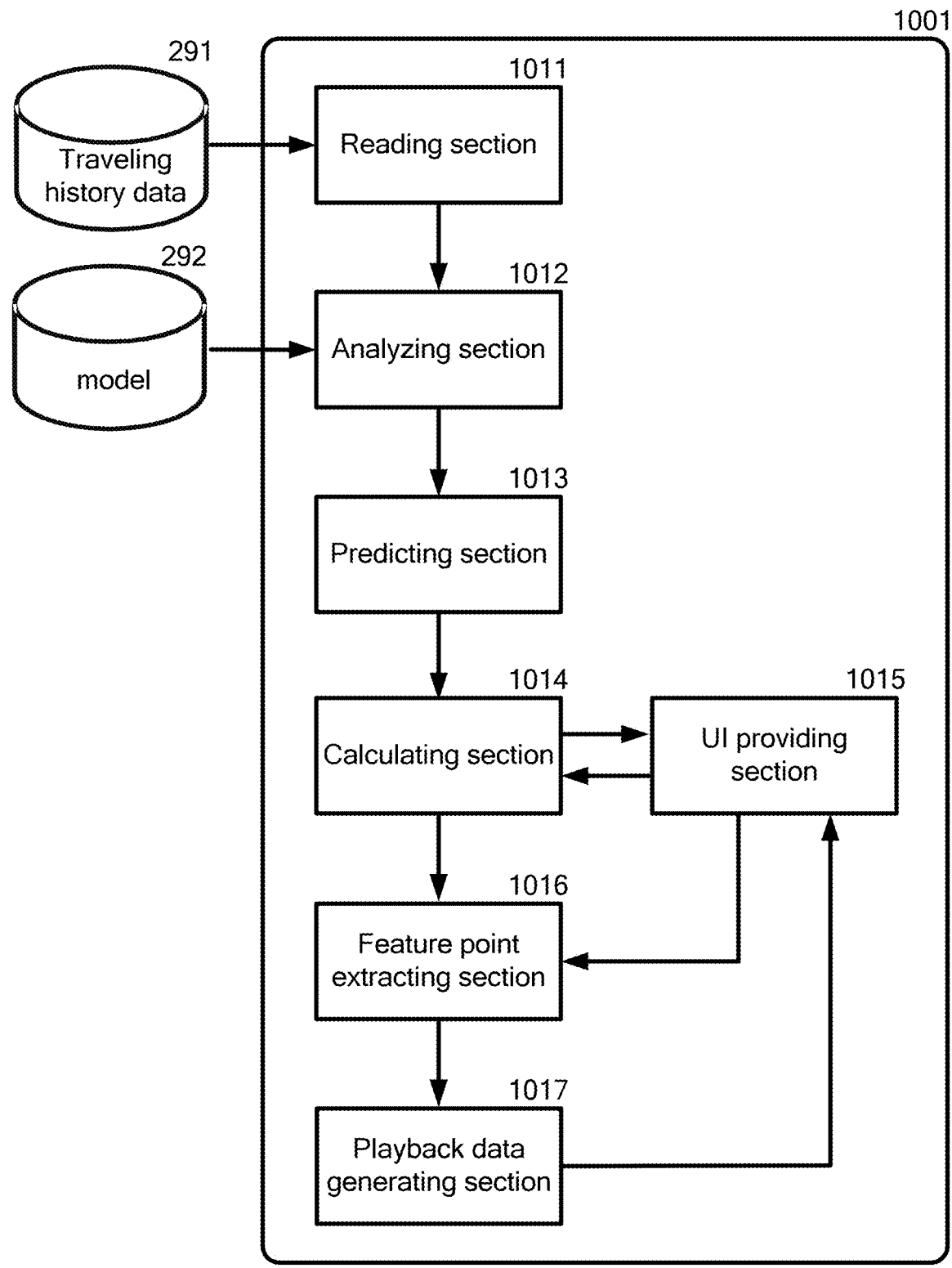
FIG. 10 is an overall functional block diagram of depicting a server computer hardware in relation to the process of FIGS. 9A to 9D, in accordance with an embodiment of the present invention.

FIG. 10 is an overall functional block diagram of depicting a server computer hardware in relation to the process of FIGS. 9A to 9D, in accordance with an embodiment of the present invention.

The computer system (1001) may correspond to the computer system (101) described in FIG. 1.

The computer system (1001) may comprise a reading section (1011), an analyzing section (1012), a predicting section (1013), a calculating section (1014) and a user interface (UI) providing section (1015). The computer system (1001) may further comprise a feature point extracting section (1016) and a playback data generating section (1017).

The reading section (1011) reads the traveling history data of a moving object from the traveling history storage (291) or a storage accessible from the computer system (1001). Alternatively, if traveling history data of plural moving objects is used instead of the traveling history data of a single moving object, the reading section (1011) reads the traveling history data of moving objects from the traveling history storage (291) or a storage accessible from the computer system (1001).

The reading section (1011) may perform step 902 described in FIG. 9A.

The analyzing section (1012) analyzes traveling history data of a moving object, using the pattern-extracting model (292), to extract a plurality of travel route patterns reflecting tendencies of movements of the moving object. Alternatively, if traveling history data of plural moving objects is used instead of the traveling history data of a single moving object, the analyzing section (1012) analyzes the traveling history data of the moving objects, using the pattern-extracting model (292), to extract a plurality of travel route patterns reflecting tendencies of movements of the moving objects.

The analyzing section (1012) may perform the operations described with respect to step 903 in FIG. 9A.

The predicting section (1013) predicts a new travel route(s) using the plurality of travel route patterns.

The predicting section (1013) may perform the operations described with respect to step 904 described in FIG. 9A.

The calculating section (1014) calculates a prediction probability between each of the plurality of travel route patterns and the new travel route.

The calculating section (1014) may recalculate a prediction probability between each of the plurality of travel route patterns and the new travel route using the changed or selected parameter.

The calculating section (1014) may copy values of the travel route in a memory and then adjust the values stored in the memory.

The calculating section (1014) may perform the operations described with respect to step 905 described in FIG. 9A and step 932 described in FIG. 9D.

The UI providing section (1015) provides a user interface for superimposingly displaying the plurality of travel route patterns and the new travel route on a map to a system where the user interface is implemented.

Further, the feature point extracting section (1016) may allow a user to change or select a parameter for extracting a feature point, if required. The UI providing section (1015) may configure the user interface such that the superimposing displaying further comprises displaying the playback using the playback data along a time axis.

Further, the feature point extracting section (1016) may allow a user to change or select a parameter associated with a plurality of travel route patterns or a parameter associated with the new travel route. The UI providing section (1015) may configures the user interface such that the superimposing displaying further comprises displaying a plurality of recalculated travel route patterns in different manners according to the recalculated prediction probability, instead of the displayed travel route patterns, or displaying the travel route patterns just before displayed.

Further, the feature point extracting section (1016) may configures the user interface such that the superimposing displaying further comprises displaying variation of the prediction probability in a format of a comparative manner, such as a table or a graph.

The user interface (UI) providing section (1015) may perform the operations described with respect to step 906 described in FIG. 9A, steps 912 and 915 described in FIG. 9B, steps 922 and 924 described in FIG. 9C, and step 932 described in FIG. 9D.

In various embodiments, the feature point extracting section (1016) extracts or determines, using a threshold value of variation of the prediction probability, a feature point reflecting a changing point of the variation of a prediction probability.

The feature point extracting section (1016) may perform the operations described with respect to step 913 described in FIG. 9B.

The playback data generating section (1017) generates playback data of the new travel route using the feature point extracted by the feature point extracting section (1016).

The playback data generating section (1017) may perform the operations described with respect to step 915 described in FIG. 9B.

The present invention may be a method, a system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for providing a user interface, the method comprising:
   providing the user interface, on a computer display, for displaying superimposed over a map:
   a plurality of travel route patterns reflecting tendencies of movements of a single moving object, and
   a new travel route predicted using the plurality of travel route patterns;
   the plurality of travel route patterns being determined in advance of the displaying by analyzing traveling history data of the single moving object; and
   wherein the plurality of travel route patterns are displayed in different manners according to a prediction probability between each of the plurality of travel route patterns and the new travel route;
   receiving an input from a user to change or select a parameter for extracting a feature point of travel prediction;
   determining the feature point of travel prediction using the changed or selected parameter; and
   recalculating a prediction probability between each of the plurality of travel route patterns and the new travel route using the changed or selected parameter.

2. The method according to claim 1, wherein, the plurality of travel route patterns extracted in advance of the displaying by analyzing traveling history data of the single moving object further comprises:
   analyzing traveling history data of two or more moving objects.

3. The method according to claim 2, wherein the superimposed displaying further comprises displaying at least one route on the basis of the traveling history data of the two or more moving objects.

4. The method according to claim 1, the method further comprising:
   generating playback data on the map of the new travel route along a time axis using the feature point.

5. The method according to claim 4, wherein the displaying superimposed further comprises displaying a playback using the playback data along a time axis.

6. The method according to claim 1, wherein the displaying superimposed further comprises displaying at least one route on the basis of traveling history data of the single moving object.

7. The method according to claim 1, further comprising:
   replacing the displayed travel route patterns with a display of a plurality of recalculated travel route patterns rendered in different manners according to the recalculated prediction probability.

8. The method according to claim 1, wherein the plurality of travel route patterns were obtained as an output of a machine learning model.

9. The method according to claim 1, further comprising displaying variation of the prediction probability in a comparative format.

10. The method according to claim 1, wherein each of the plurality of travel route patterns is associated with one of: a prediction probability between each of the plurality of travel route patterns and the new travel route, or a prediction probability associated with a time stamp.

11. The method according to claim 1, wherein the user interface is implemented in a debug system for a navigation system.

12. The method according to claim 1, wherein the traveling history data of the single moving object is used when carrying out a Most Probable Path and Destination Prediction algorithm.

13. The method according to claim 1, wherein the parameter is associated with the plurality of travel route patterns, the parameter is associated with the new travel route patterns, or the parameter is associated with current traveling data.

14. A computer system, comprising:
   one or more processors; and a memory storing a program which, when executed on the one or more processors, performs operations of providing a user interface, the operations comprising:

providing the user interface, on a computer display, for displaying superimposed over a map:
- a plurality of travel route patterns reflecting tendencies of movements of a single moving object, and
- a new travel route predicted using the plurality of travel route patterns;

the plurality of travel route patterns being determined in advance of the displaying by analyzing traveling history data of the single moving object; and wherein the plurality of travel route patterns are displayed in different manners according to a prediction probability between each of the plurality of travel route patterns and the new travel route;

receiving an input from a user to change or select a parameter for extracting a feature point of travel prediction;

determining the feature point of travel prediction using the changed or selected parameter; and recalculating a prediction probability between each of the plurality of travel route patterns and the new travel route using the changed or selected parameter.

15. A computer program product for providing a user interface, the computer program product comprising a non-transitory computer readable storage medium having program instructions embodied therewith, the program instructions executable by a computer to cause the computer to perform a method comprising:

providing the user interface, on a computer display, for displaying superimposed over a map:
- a plurality of travel route patterns reflecting tendencies of movements of a single moving object, and a new travel route predicted using the plurality of travel route patterns;

the plurality of travel route patterns being determined in advance of the displaying by analyzing traveling history data of the single moving object; and wherein the plurality of travel route patterns are displayed in different manners according to a prediction probability between each of the plurality of travel route patterns and the new travel route;

receiving an input from a user to change or select a parameter for extracting a feature point of travel prediction;

determining the feature point of travel prediction using the changed or selected parameter; and recalculating a prediction probability between each of the plurality of travel route patterns and the new travel route using the changed or selected parameter.

* * * * *